(12) United States Patent
Hirose et al.

(10) Patent No.: US 11,234,074 B2
(45) Date of Patent: Jan. 25, 2022

(54) SOUND PICKUP DEVICE, SOUND PICKUP SYSTEM, SOUND PICKUP METHOD, PROGRAM, AND CALIBRATION METHOD

(71) Applicant: Panasonic Intellectual Property Management Co., Ltd., Osaka (JP)

(72) Inventors: Yoshifumi Hirose, Kyoto (JP); Yusuke Adachi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 34 days.

(21) Appl. No.: 16/730,994

(22) Filed: Dec. 30, 2019

(65) Prior Publication Data

US 2020/0137492 A1    Apr. 30, 2020

Related U.S. Application Data

(63) Continuation of application No. PCT/JP2018/025300, filed on Jul. 4, 2018.

(30) Foreign Application Priority Data

Sep. 8, 2017    (JP) .............................. JP2017-173162

(51) Int. Cl.
*H04R 3/00*    (2006.01)
*H04N 5/232*    (2006.01)
(Continued)

(52) U.S. Cl.
CPC ........... *H04R 3/005* (2013.01); *H04N 5/2253* (2013.01); *H04N 5/2254* (2013.01);
(Continued)

(58) Field of Classification Search
CPC ...... H04R 3/005; H04R 1/406; H04R 29/005; H04R 1/04; H04N 5/23299; H04N 5/2253; H04N 5/2254
(Continued)

(56) References Cited

U.S. PATENT DOCUMENTS 9,262,800 B2 *    2/2016    Cilia ..................... G06T 3/0062
2003/0007085 A1    1/2003    Hayashida
(Continued)

FOREIGN PATENT DOCUMENTS

CN    205450536 U    8/2016
JP    2002-369073 A    12/2002
(Continued)

OTHER PUBLICATIONS

Extended European Search Report dated Oct. 30, 2020 for the related European Patent Application No. 18852945.7.
(Continued)

*Primary Examiner* — Paul Kim
(74) *Attorney, Agent, or Firm* — McDermott Will & Emery LLP

(57) ABSTRACT

A sound pickup device includes a sound pickup unit, a mounting part, and a communication unit. The sound pickup unit includes a microphone array including a plurality of microphones. The sound pickup unit generates an acoustic signal that corresponds to ambient sound that has been picked up by the microphone array. An electronic device is mounted on the mounting part and the electronic device includes a camera that generates image data by imaging surroundings. The communication unit transmits the acoustic signal to the electronic device.

12 Claims, 14 Drawing Sheets

(51) Int. Cl.
*H04N 5/225* (2006.01)
*H04R 1/04* (2006.01)
*H04R 1/40* (2006.01)
*H04R 29/00* (2006.01)

(52) U.S. Cl.
CPC ........... *H04N 5/23299* (2018.08); *H04R 1/04* (2013.01); *H04R 1/406* (2013.01); *H04R 29/005* (2013.01)

(58) Field of Classification Search
USPC .......................................................... 381/92
See application file for complete search history.

(56) References Cited

U.S. PATENT DOCUMENTS

| 2016/0142620 | A1 | 5/2016 | Sawa et al. | |
|---|---|---|---|---|
| 2016/0227340 | A1* | 8/2016 | Peters | ..................... H04S 3/008 |
| 2016/0234593 | A1 | 8/2016 | Matsumoto et al. | |
| 2016/0269622 | A1* | 9/2016 | Melnyk | ................. H04N 5/2224 |
| 2016/0381459 | A1* | 12/2016 | Baca | ..................... H04N 13/254 386/227 |

FOREIGN PATENT DOCUMENTS

| JP | 2009-141501 | | 6/2009 |
|---|---|---|---|
| JP | 2010-152183 | | 7/2010 |
| JP | 5215826 | B | 6/2013 |
| JP | 2013-257518 | A | 12/2013 |
| JP | 2014-236347 | | 12/2014 |
| JP | 2016-146547 | | 8/2016 |
| JP | 2014-125835 | A1 | 2/2017 |
| WO | 2013/102251 | A1 | 7/2013 |
| WO | 2014/125835 | A1 | 8/2014 |

OTHER PUBLICATIONS

International Search Report of PCT application No. PCT/JP2018/025300 dated Oct. 9, 2018.

* cited by examiner

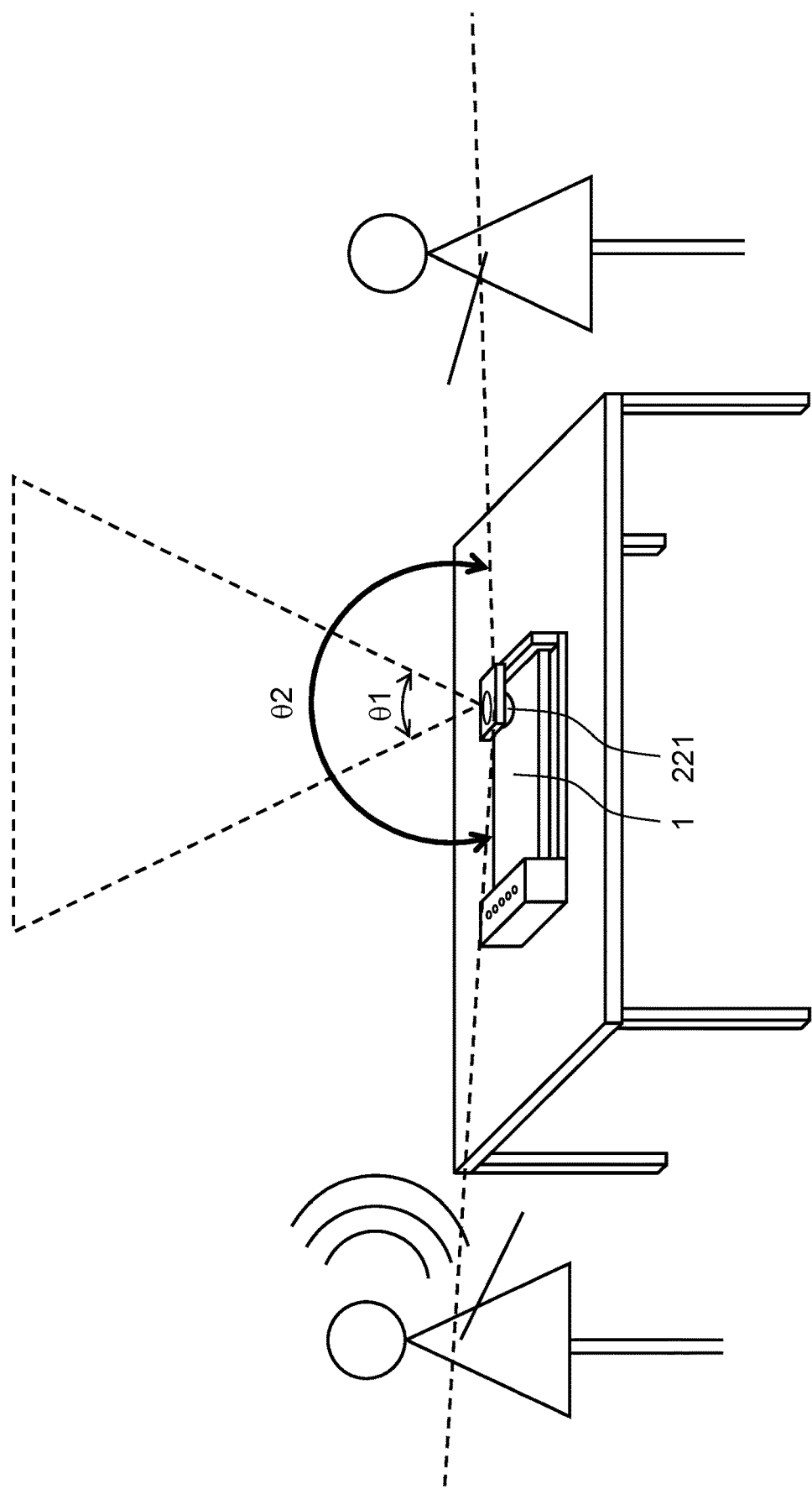

SOUND PICKUP DEVICE, SOUND PICKUP SYSTEM, SOUND PICKUP METHOD, PROGRAM, AND CALIBRATION METHOD

TECHNICAL FIELD

The present disclosure relates to a sound pickup device, a sound pickup system, a sound pickup method, a program, and a calibration method for picking up target sound.

BACKGROUND ART

PTL 1 discloses an estimation apparatus that estimates which participant has made an utterance and when the participant has made the utterance on the basis of data recording conversation made by one or more participants. This estimation apparatus integrates information obtained from an acoustic signal that has been output from a microphone with information obtained from a video signal that has been output from a camera so as to calculate a probability of a conversation participant having made an utterance. By doing this, even in a case where a conversation participant has moved without any utterance, a location of the conversation participant can be traced.

CITATION LIST

Patent Literature

PTL 1: Japanese Patent No. 5215826

SUMMARY

The present disclosure provides a sound pickup device, a sound pickup system, a sound pickup method, a program, and a calibration method that enable target sound to be precisely picked up.

A sound pickup device in one aspect of the present disclosure includes a sound pickup unit, a mounting part, and a communication unit. The sound pickup unit includes a microphone array including a plurality of microphones. The sound pickup unit generates an acoustic signal that corresponds to ambient sound that has been picked up by the microphone array. An electronic device is mounted on the mounting part and the electronic device includes a camera that generates image data by imaging surroundings. The communication unit transmits the acoustic signal to the electronic device.

These general and specified aspects may be achieved by a system, a method, and a computer program, and any combination of the system, the method, and the computer program.

By employing a sound pickup device, a sound pickup system, a sound pickup method, a program, and a calibration method according to the present disclosure, target sound can be precisely picked up by attaching an electronic device including a camera to the sound pickup device.

BRIEF DESCRIPTION OF DRAWINGS

FIG. 5 is a diagram for explaining that an optical system of a sound pickup device enables wide-angle image capturing.

DESCRIPTION OF EMBODIMENTS (Knowledge Underlying the Present Disclosure)

The estimation apparatus of PTL 1 is dedicated sound pickup equipment that includes both a camera and a plurality of microphones. The present disclosure enables target sound to be precisely picked up without using dedicated sound pickup equipment. Specifically, the present disclosure causes target sound to be picked up by attaching an electronic device including a camera to a sound pickup device including a microphone array.

First Exemplary Embodiment

A first exemplary embodiment is described below with reference to the drawings. In the present exemplary embodiment, an example is described where a person's speech is picked up as target sound.

1. Configuration of Sound Pickup System

Figure 1:
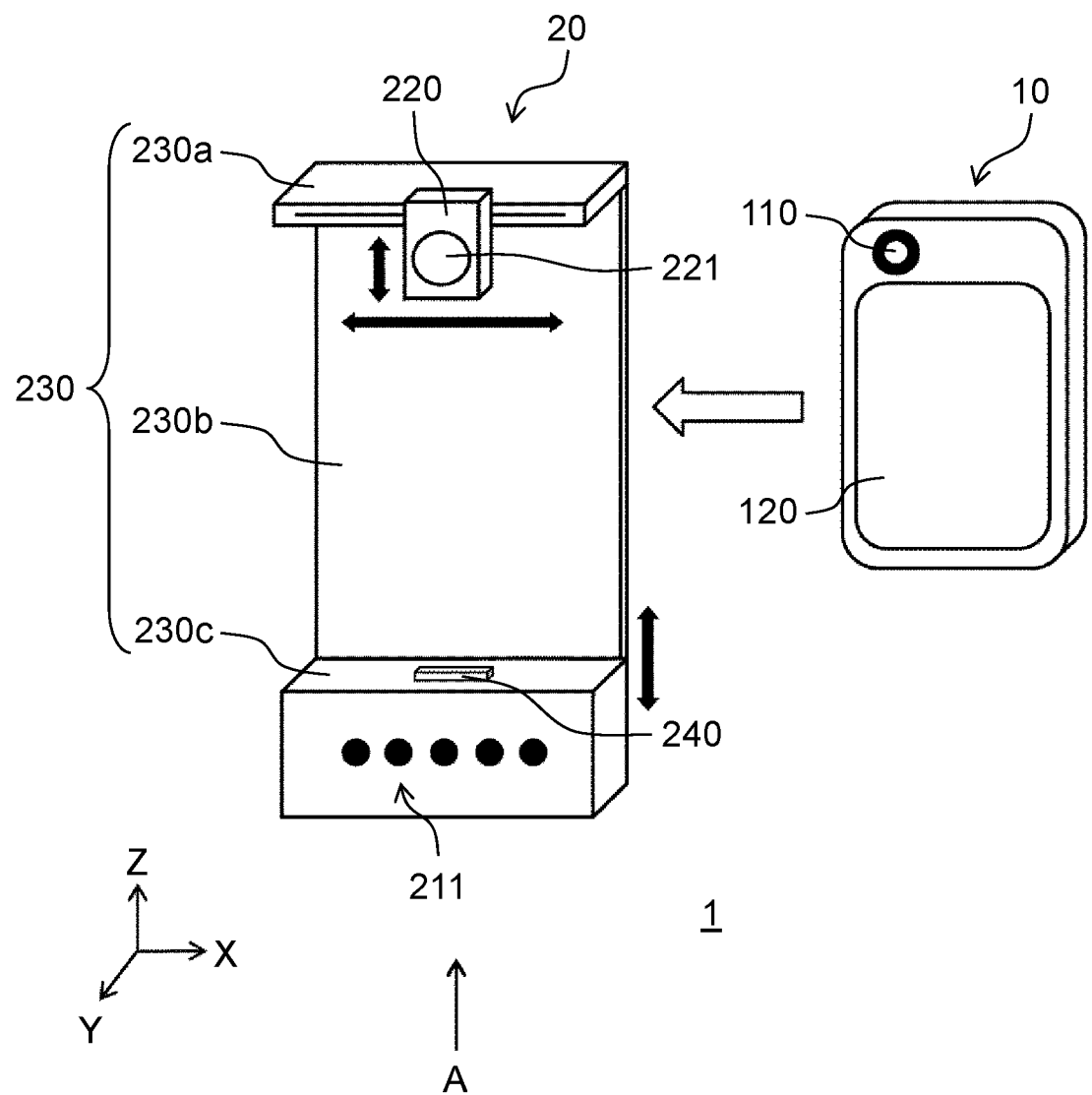
FIG. 1 is a diagram illustrating a sound pickup device and an electronic device according to a first exemplary embodiment.
Figure 2:
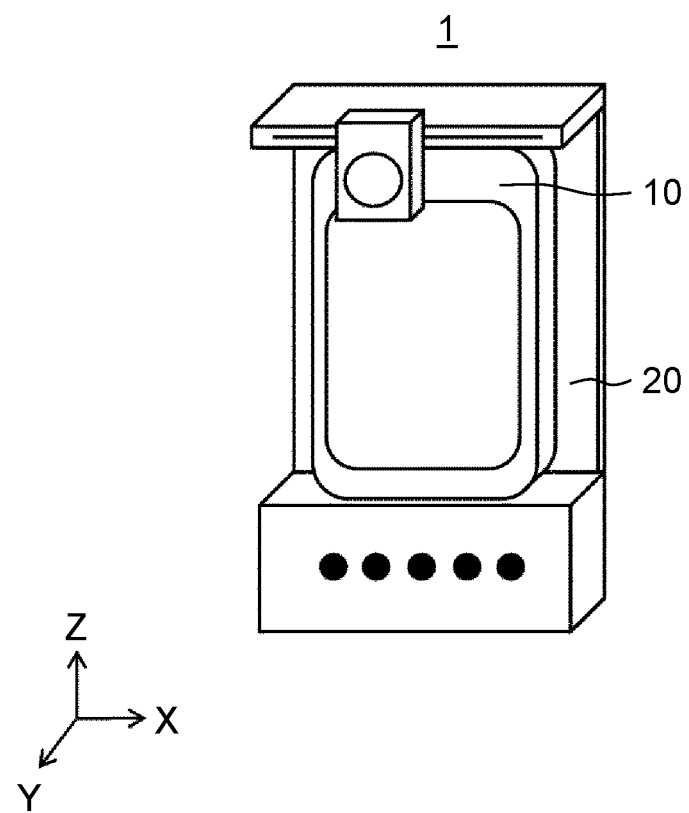
FIG. 2 is a diagram illustrating a sound pickup system in a state where the electronic device is mounted in the sound pickup device according to the first exemplary embodiment.

FIG. 1 illustrates a sound pickup device and an electronic device according to the first exemplary embodiment of the present disclosure. FIG. 2 illustrates a configuration of a sound pickup system according to the first exemplary embodiment of the present disclosure. As illustrated in FIGS. 1 and 2, sound pickup system 1 includes electronic device 10 and sound pickup device 20 that can be mounted with electronic device 10. Sound pickup system 1 is used to pick up, for example, a person's speech during a conference.

Electronic device 10 is a mobile terminal such as a smartphone or a tablet terminal. Electronic device 10 includes camera 110 and display 120. An optical-axis direction of camera 110 is the same as a display direction of display 120.

Camera 110 includes a charge-coupled device (CCD) image sensor, a complementary metal oxide semiconductor (CMOS) image sensor, an N-channel metal oxide semiconductor (NMOS) image sensor, or the like. Camera 110 images the surroundings, and generates image data serving as a video signal. Display 120 is configured by a liquid crystal display device or an organic electroluminescence (EL) display device. Display 120 displays an image captured by camera 110, or the like.

Sound pickup device 20 includes microphone array 211, wide-angle assistance part 220, mounting part 230, and communication unit 240. Sound pickup device 20 is peripheral equipment that is mounted with electronic device 10 so as to perform communication with electronic device 10.

Microphone array 211 includes a plurality of microphones. Microphone array 211 picks up ambient sound, and generates an acoustic signal that corresponds to the sound that has been picked up. In FIG. 1, the plurality of microphones is linearly disposed, but the plurality of microphones does not always need to be linearly disposed. For example, the plurality of microphones may be disposed in a two-dimensionally spreading shape such as a semicircular shape or a circular shape. Wide-angle assistance part 220 includes optical system 221. Optical system 221 includes a wide-angle lens having a roughly omnidirectional angle of view.

Mounting part 230 is a member that is mounted with electronic device 10 and fixes electronic device 10. Mounting part 230 includes, as an example, upper plate 230*a*, back plate 230*b*, and lower block 230*c*. Mounting part 230 sandwiches both ends in a longitudinal direction (a Z-axis direction in FIGS. 1 and 2) of electronic device 10 so as to fix electronic device 10. In the present exemplary embodiment, microphone array 211 is attached to lower block 230*c*.

Communication unit 240 includes a circuit that performs communication with an external device in conformity with a predetermined communication standard (such as local area network (LAN), WiFi, Bluetooth (registered trademark), universal serial bus (USB), or high-definition multimedia interface (HDMI) (registered trademark)). In the present exemplary embodiment, communication unit 240 is a USB terminal (a male terminal), and is connected to a USB terminal (a female terminal) of electronic device 10. In the present exemplary embodiment, communication unit 240 is attached to lower block 230*c*. As described later, lower block 230*c* is movable to fix electronic device 10. Therefore, communication unit 240 serving as a USB terminal can be easily connected to the USB terminal of electronic device 10.

Figure 3A:
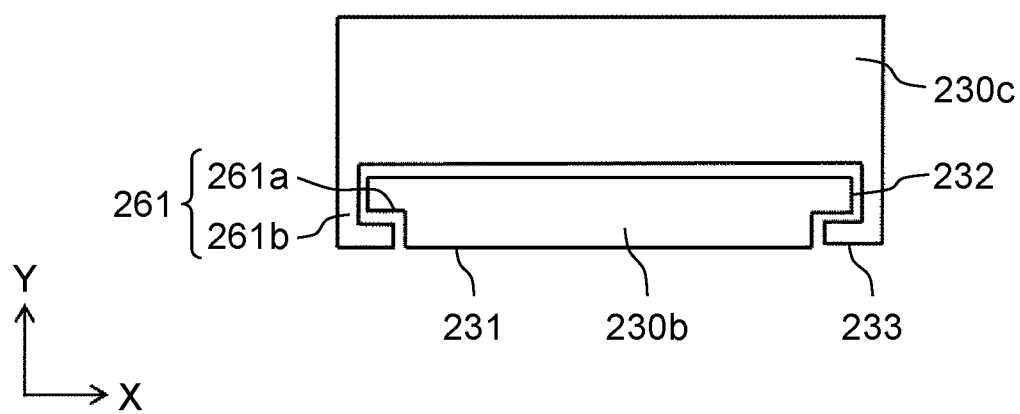
FIG. 3A is a diagram schematically illustrating an example of a movable part that causes a mounting part to be movable.
Figure 3B:
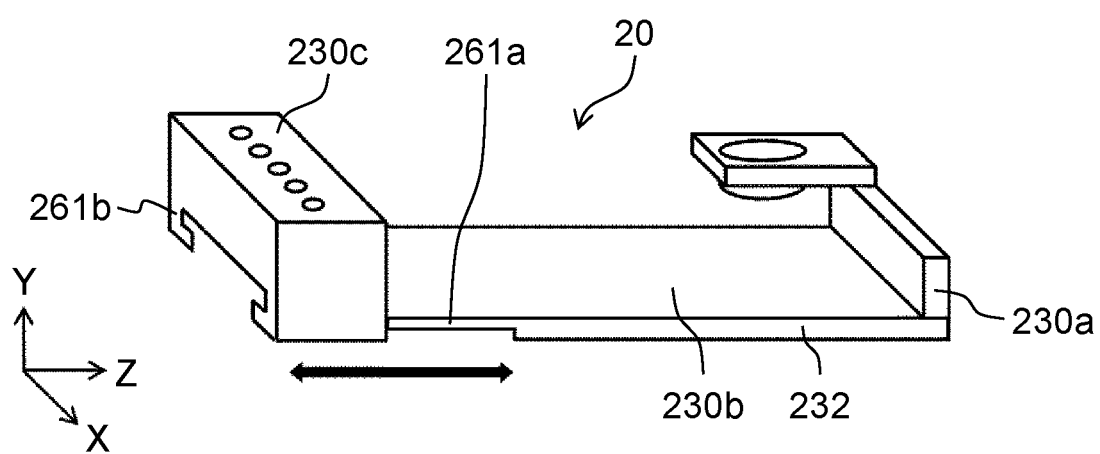
FIG. 3B is a diagram for explaining a movable direction of the mounting part.

FIG. 3A is a diagram schematically illustrating an example of a movable part that causes mounting part 230 to be movable. FIG. 3A illustrates a view from a lower side (a direction illustrated as arrow A in FIG. 1) of sound pickup device 20. FIG. 3B is a diagram for explaining a movable direction of mounting part 230. Sound pickup device 20 includes movable part 261 that causes lower block 230*c* or back plate 230*b* to be movable in a direction in which lower block 230*c* moves away from or toward upper plate 230*a* (a Z-axis direction in FIG. 3B). Movable part 261 has an arbitrary configuration. For example, movable part 261 is configured by a sliding mechanism that includes L-shaped cutout 261*a* and roughly U-shaped cutout 261*b*. L-shaped cutout 261*a* is formed on both sides 232 and back surface 231 of back plate 230*b*. In addition, L-shaped cutout 261*a* is provided in a position closer to lower block 230*c* than a center of back plate 230*b*. Roughly U-shaped cutout 261*b* is formed on back surface side 233 of lower block 230*c*. L-shaped cutout 261*a* of back plate 230*b* is fitted into roughly U-shaped cutout 261*b* of lower block 230*c*. This enables lower block 230*c* or back plate 230*b* to be moved in the Z-axis direction. A size of electronic device 10 changes according to a type of electronic device 10. By using movable part 261, a user can move lower block 230*c* or back plate 230*b* in the Z-axis direction according to the size of electronic device 10 so as to fix electronic device 10 between upper plate 230*a* and lower block 230*c*.

Figure 4A:
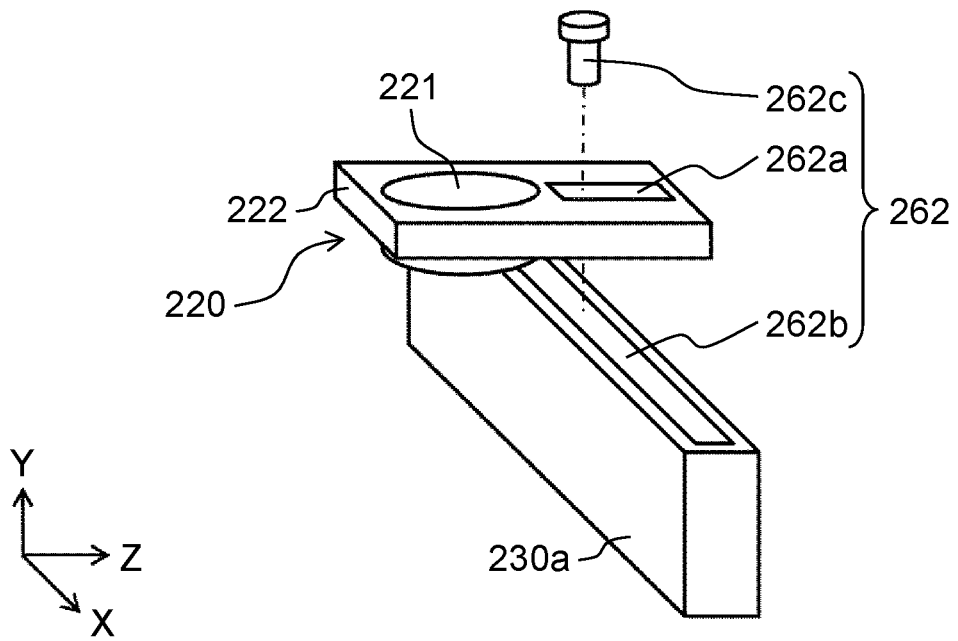
FIG. 4A is an exploded perspective view schematically illustrating an example of a movable part that causes a location of an optical system to be movable.
Figure 4B:
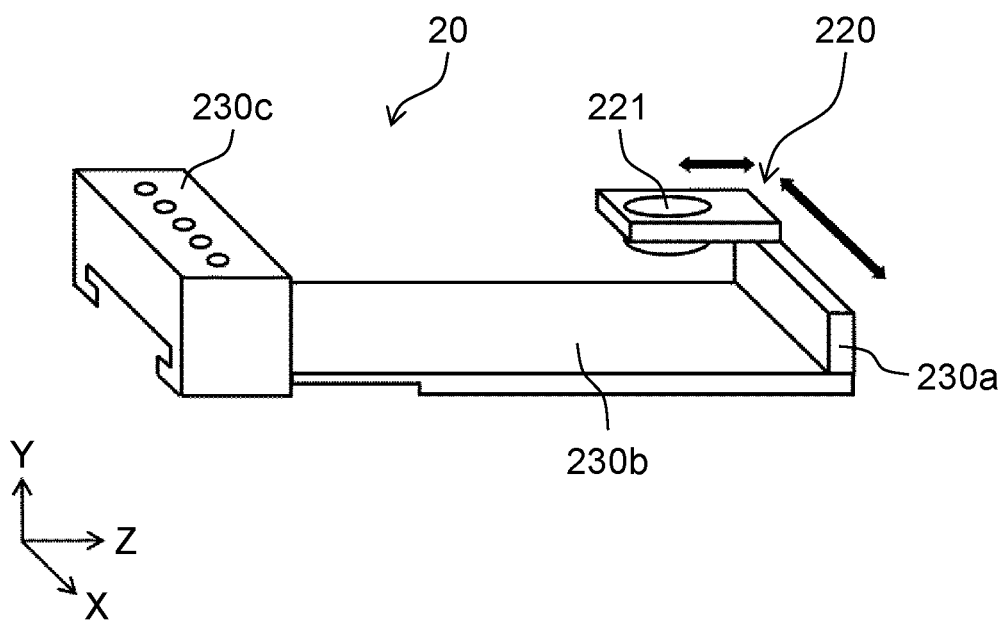
FIG. 4B is a diagram for explaining a movable direction of the location of the optical system.

FIG. 4A is an exploded perspective view schematically illustrating an example of a movable part that causes a location of optical system 221 to be movable. FIG. 4B is a diagram for explaining a movable direction of the location of optical system 221. Sound pickup device 20 includes movable part 262 that causes optical system 221 to be movable to positions in a width direction (an X-axis direction in FIGS. 4A and 4B) and a longitudinal direction (a Z-axis direction in FIGS. 4A and 4B) of sound pickup device 20. Movable part 262 has an arbitrary configuration. For example, movable part 262 is configured by a sliding mechanism that includes through-hole 262*a*, recess 262*b*, and projection 262*c*. Projection 262*c* can pass through 262*a*, and can move in recess 262*b*. As illustrated in FIG. 4A, wide-angle assistance part 220 includes optical system 221, and attachment member 222 to which optical system 221 is attached. In the example illustrated in FIG. 4A, through-hole 262*a* that extends in the Z-axis direction is formed in attachment member 222. Recess 262*b* that extends in the X-axis direction is formed in upper plate 230*a*. A location of camera 110 changes according to the type of electronic device 10. By using movable part 262, a user can move wide-angle assistance part 220 in such a way that optical system 221 of sound pickup device 20 is located on an optical axis of camera 110 of electronic device 10.

FIG. 5 is a diagram for explaining that optical system 221 of sound pickup device 20 enables wide-angle image capturing. In electronic device 10, camera 110 (what is called a front camera) that is equipped on a surface including display 120 is often used to image an owner themselves of electronic device 10. Therefore, normally, camera 110 does not include a wide-angle lens. Camera 110 includes, for example, a standard lens having angle of view $\theta 1$ (for example, 40° to) 50°. On the other hand, optical system 221 of sound pickup device 20 includes a wide-angle lens having angle of view $\theta 2$ (for example, 170° to 180°) by being combined with a lens incorporated into camera 110. Angle of view $\theta 2$ is not limited to this, and any lens can be used that has a wider angle of view than an angle of view of the lens incorporated into camera 110. Therefore, by disposing optical system 221 on the optical axis of camera 110, an angle of view at the time of image capturing is widened from $\theta 1$ (for example, 40° to 50°) to $\theta 2$ (for example, 170° to 180°). By doing this, even when sound pickup system 1 is flatly placed, and stated another way, even when an optical-axis direction of camera 110 is almost the same as a vertical direction, a person who is present around sound pickup system 1 can be imaged.

Figure 6:
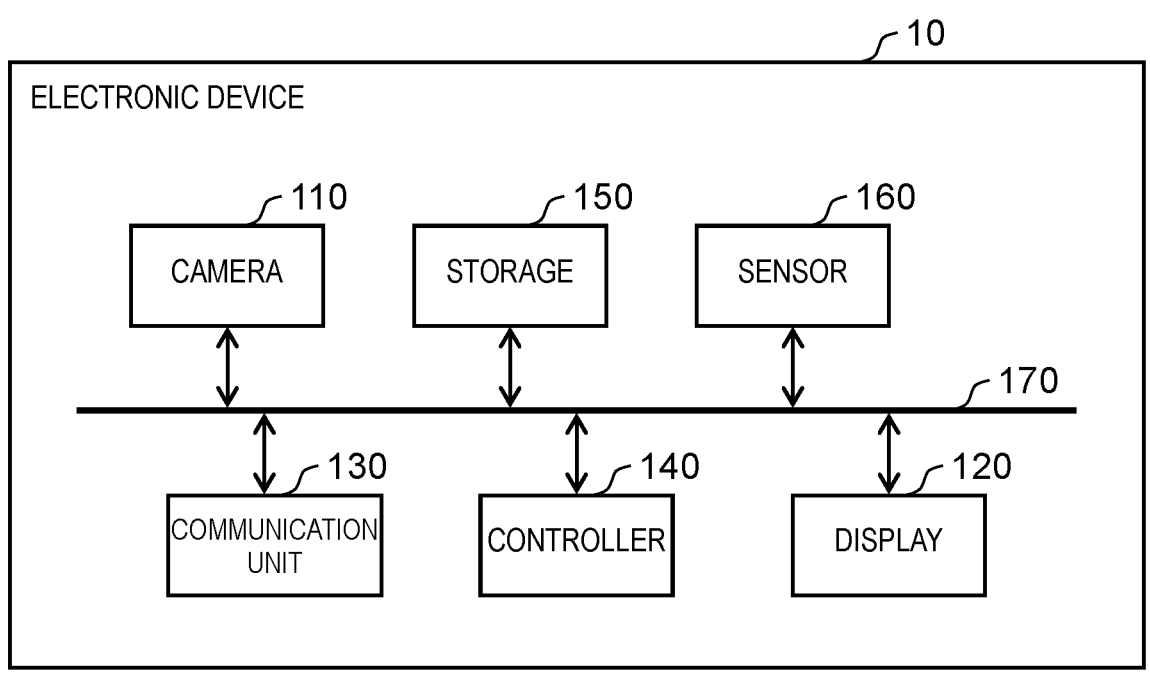
FIG. 6 is a block diagram illustrating a configuration of the electronic device of FIG. 1.

FIG. 6 illustrates an electric configuration of electronic device 10. Electronic device 10 further includes communication unit 130, controller 140, storage 150, sensor 160, and bus 170 in addition to camera 110 and display 120.

Communication unit 130 includes a circuit that performs communication with an external device in conformity with a predetermined communication standard (such as LAN, WiFi, Bluetooth, USB, or HDMI). In the present exemplary embodiment, communication unit 130 is a USB terminal (a female terminal). Communication unit 130 receives an acoustic signal that has been output from sound pickup device 20.

Controller 140 controls an entirety of electronic device 10. Controller 140 can be implemented by a semiconductor element or the like. Controller 140 can be configured, for example, by a microcomputer, a central processing unit (CPU), a microprocessor unit (MPU), a digital signal processor (DSP), a field programmable gate array (FPGA), or an application specific integrated circuit (ASIC). Functions of controller 140 may be configured by only hardware, or may be implemented by a combination of hardware and software. Controller 140 determines a sound pickup direction on the basis of the image data obtained from camera 110 and the acoustic signal obtained from sound pickup device 20. Controller 140 extracts target sound from the acoustic signal on the basis of the determined sound pickup direction.

Storage 150 stores the image data obtained from camera 110 and the acoustic signal obtained from sound pickup device 20. Storage 150 can be implemented, for example, by a hard disk (HDD), a solid state drive (SSD), a random access memory (RAM), a dynamic random access memory (DRAM), a ferroelectric memory, a flash memory, a magnetic disk, or any combination of these.

Sensor 160 includes an acceleration sensor that detects acceleration or a gyro sensor that detects angular velocity. Whether electronic device 10 is vertically placed, is flatly placed, or has a state between vertical placing and flat placing can be detected on the basis of an output of sensor 160. "Vertical placing" is placing that causes a direction of the optical axis of camera 110 to be almost the same as a horizontal plane direction. "Flat placing" is placing that causes the direction of the optical axis of camera 110 to be almost the same as a vertical direction.

Bus 170 is a signal line that electrically connects camera 110, display 120, communication unit 130, controller 140, storage 150, and sensor 160.

Figure 7:
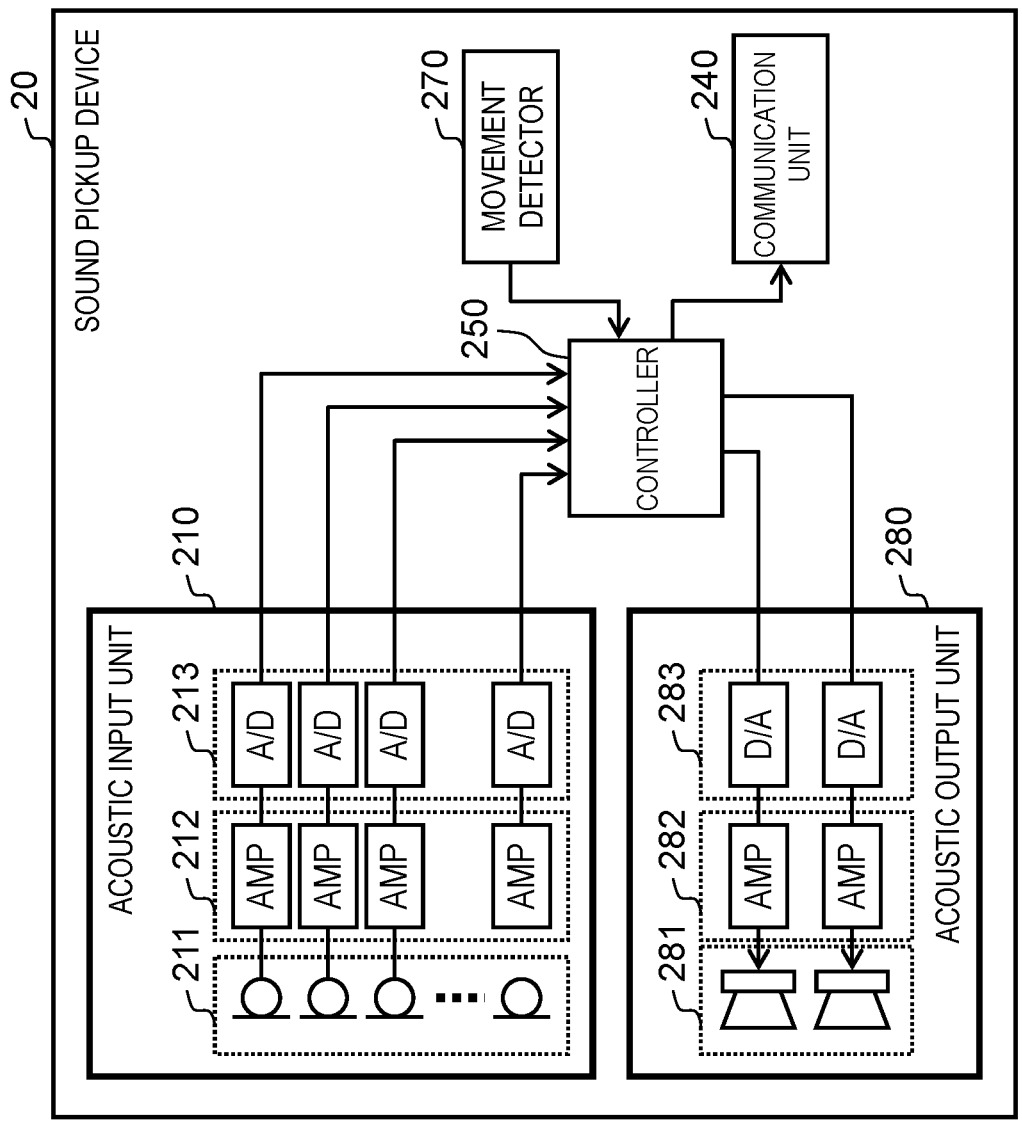
FIG. 7 is a block diagram illustrating a configuration of the sound pickup device of FIG. 1.

FIG. 7 illustrates an electric configuration of sound pickup device 20. Sound pickup device 20 includes acoustic input unit (sound pickup unit) 210, communication unit 240, controller 250, movement detector 270, and acoustic output unit 280.

Acoustic input unit 210 includes microphone array 211, a plurality of amplifiers 212, and a plurality of analog-to-digital (A/D) converters 213. Microphone array 211 picks up ambient sound (acoustic waves) by using the plurality of microphones, converts the sound that has been picked up into an electric signal, and outputs an analog acoustic signal. Each of amplifiers 212 amplifies an analog acoustic signal that has been output from each of the microphones. Each of A/D converters 213 converts the analog acoustic signal that has been output from each of amplifiers 212 into a digital acoustic signal.

Controller 250 controls an entirety of sound pickup device 20. Controller 250 transmits the digital acoustic signal to electronic device 10 via communication unit 240. Controller 250 can be implemented by a semiconductor element or the like. Controller 250 can be configured, for example, by a microcomputer, a CPU, an MPU, a DSP, an FPGA, or an ASIC. Functions of controller 250 may be configured by only hardware, or may be implemented by a combination of hardware and software.

Movement detector 270 includes a detection element that detects an amount of movement of lower block 230c or back plate 230b that has been caused by movable part 261, and a detection element that detects an amount of movement of optical system 221 that has been caused by movable part 262. Controller 250 detects a location of microphone array 211 and a location of optical system 221 on the basis of an output of movement detector 270. Then, movement detector 270 detects relative locations of optical system 221 (and camera 110) and microphone array 211. The location of microphone array 211 is a center position of microphone array 211, for example, a location of a microphone that is located in a center of microphone array 211. A method for detecting an amount of movement is not particularly limited. For example, an amount of movement may be calculated by using an optical linear incremental encoder that detects a change in an amount of light by using a light-emitting element and a light-receiving device and outputs a change amount, or a resistance type positioning sensor that outputs a voltage in proportion to a mechanical location.

Acoustic output unit 280 includes digital-to-analog (D/A) converter 283, amplifier 282, and speaker 281. D/A converter 283 converts a digital acoustic signal that has been received from controller 250 into an analog acoustic signal. Amplifier 282 amplifies the analog acoustic signal. Speaker 281 outputs the amplified analog acoustic signal. Acoustic output unit 280 may include one or more D/A converters 283, one or more amplifiers 282, and one or more speakers 281. In the present exemplary embodiment, sound pickup device 20 has a function of transmitting, to electronic device 10, an acoustic signal generated by microphone array 211. Therefore, acoustic output unit 280 may be omitted from sound pickup device 20. In a case where acoustic output unit 280 is omitted from sound pickup device 20, a speaker of electronic device 10 may output an acoustic signal instead of acoustic output unit 280.

2. Operation of Sound Pickup System
2.1. Entire Operation

Figure 8:
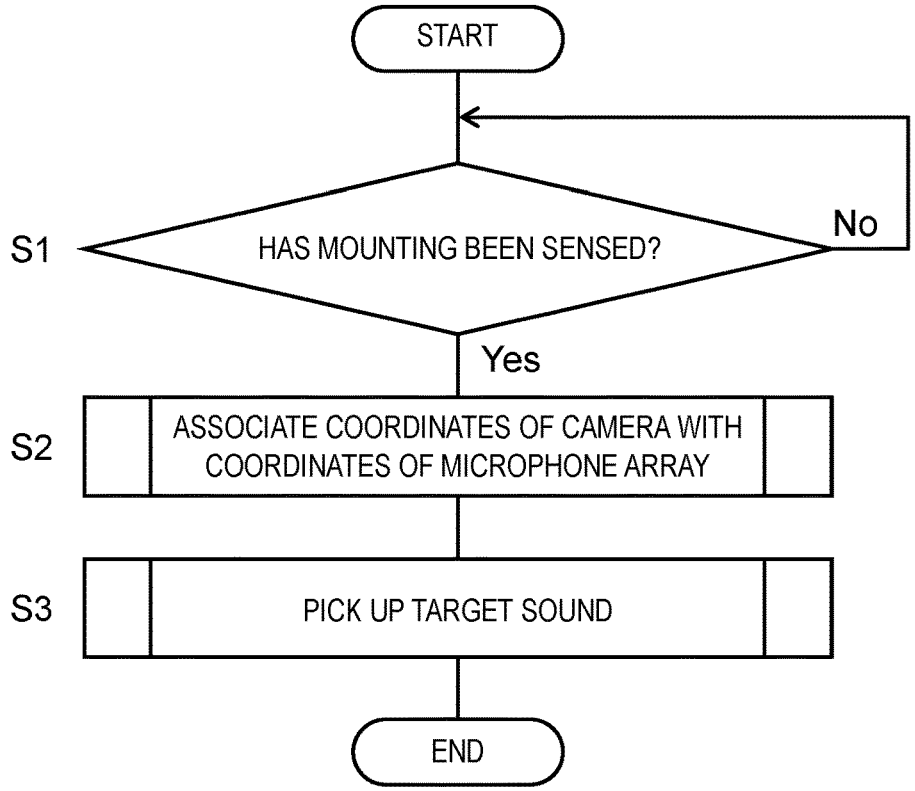
FIG. 8 is a flowchart for explaining an entire operation of sound pickup.

FIG. 8 illustrates an entire operation of sound pickup performed by controller 140 of electronic device 10. In the present exemplary embodiment, controller 140 of electronic device 10 picks up target sound on the basis of an acoustic signal that has been output from microphone array 211 and image data that has been output from camera 110.

Controller 140 of electronic device 10 determines whether electronic device 10 is mounted in sound pickup device 20 (S1). For example, when a male terminal of communication unit 240 of sound pickup device 20 is connected to a female terminal of communication unit 130 of electronic device 10 by a user, sound pickup device 20 transmits, to electronic device 10, information relating to sound pickup device 20. By doing this, electronic device 10 senses that electronic device 10 has been mounted in sound pickup device 20.

A size in a longitudinal direction of electronic device 10 and a location of camera 110 change according to the type of electronic device 10. Therefore, a locational relationship between camera 110 of electronic device 10 and microphone array 211 of sound pickup device 20 changes according to electronic device 10 mounted in sound pickup device 20. Accordingly, when controller 140 of electronic device 10 senses that electronic device 10 has been mounted in sound pickup device 20 (Yes in S1), controller 140 associates coordinates of camera 110 with coordinates of microphone array 211 (S2). Herein, association of coordinates between camera 110 and microphone array 211 is also referred to as "calibration".

After controller 140 performs association of coordinates between camera 110 and microphone array 211, controller 140 picks up target sound on the basis of the image data obtained from camera 110 and the acoustic signal obtained from microphone array 211 (S3).

2.2 Association of Coordinates Between Camera and Microphone Array

Figure 9:
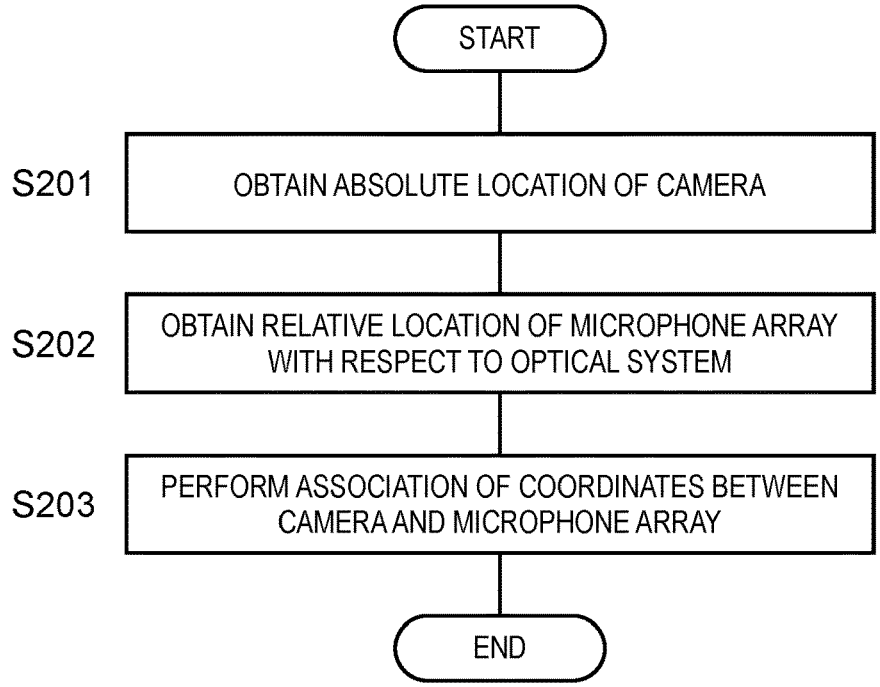
FIG. 9 is a flowchart for explaining association of coordinates between a camera and a microphone array according to the first exemplary embodiment.

FIG. 9 illustrates an example of association of coordinates between camera 110 and microphone array 211 (details of S2). Controller 140 of electronic device 10 obtains an absolute location of camera 110 (S201). Setting information indicating the absolute location of camera 110 has been stored in storage 150 of electronic device 10. Therefore, controller 140 reads the setting information from storage 150 so as to specify the absolute location of camera 110.

Controller 140 obtains, from sound pickup device 20, a relative location of microphone array 211 with respect to optical system 221 (S202). Specifically, controller 250 of sound pickup device 20 detects a respective location of microphone array 211 with a location of optical system 221 as a reference on the basis of an output of movement detector 270, and transmits the relative location to electronic device 10.

Optical system 221 of sound pickup device 20 is disposed on the optical axis of camera 110 of electronic device 10 by a user. Therefore, controller 140 of electronic device 10 obtains the relative location of microphone array 211 with the location of optical system 221 as a reference, as a relative location of microphone array 211 with a location of camera 110 as a reference. Then, controller 140 performs association of coordinates between camera 110 and microphone array 211 on the basis of the absolute location of camera 110 and the relative location of microphone array 211 (S203). For example, a function or a table that enables coordinates of camera 110 to be converted into coordinates of microphone array 211 is generated.

2.3 Pickup of Target Sound

Figure 10:
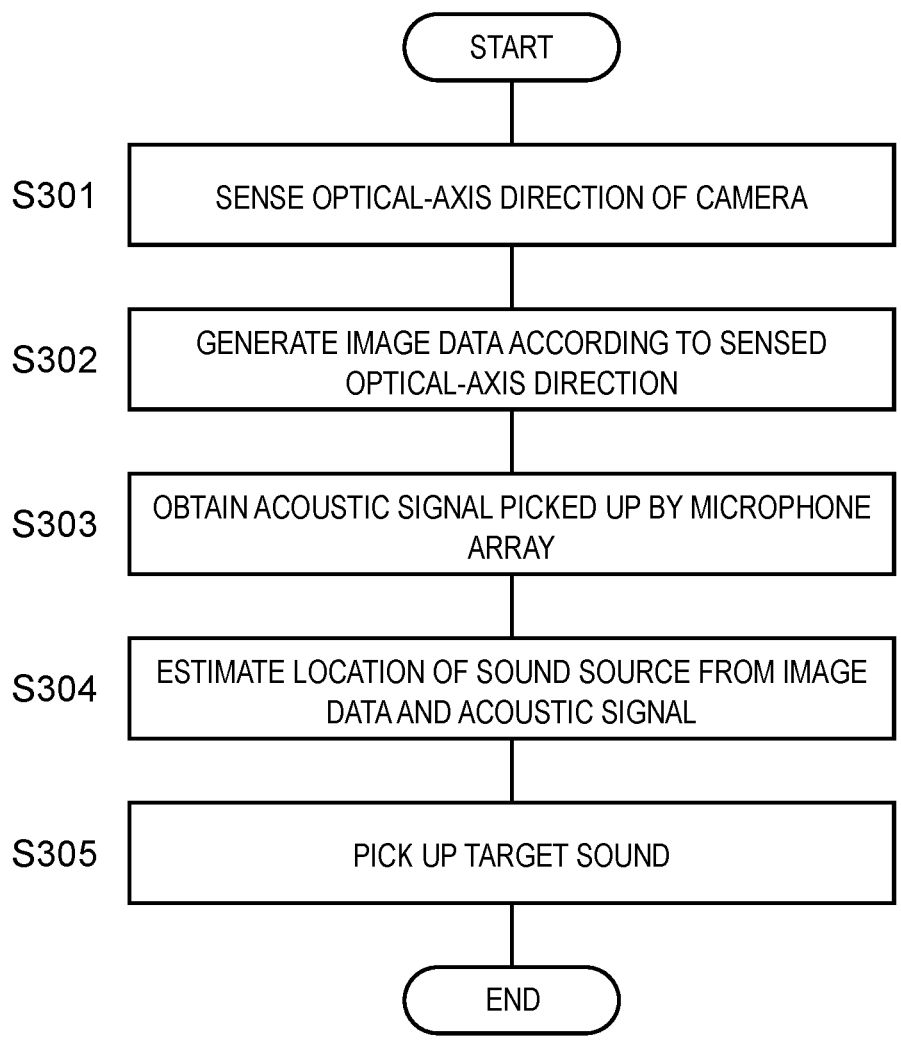
FIG. 10 is a flowchart for explaining an operation to pick up target sound.

FIG. 10 illustrates an example of an operation to pick up target sound (details of S3). Controller 140 of electronic device 10 senses an optical-axis direction of camera 110 on the basis of an output of sensor 160 (S301). For example, controller 140 detects whether electronic device 10 is vertically placed or flatly placed on the basis of an output of sensor 160 so as to sense that the optical-axis direction of camera 110 is a horizontal direction or a vertical direction.

Figure 11:
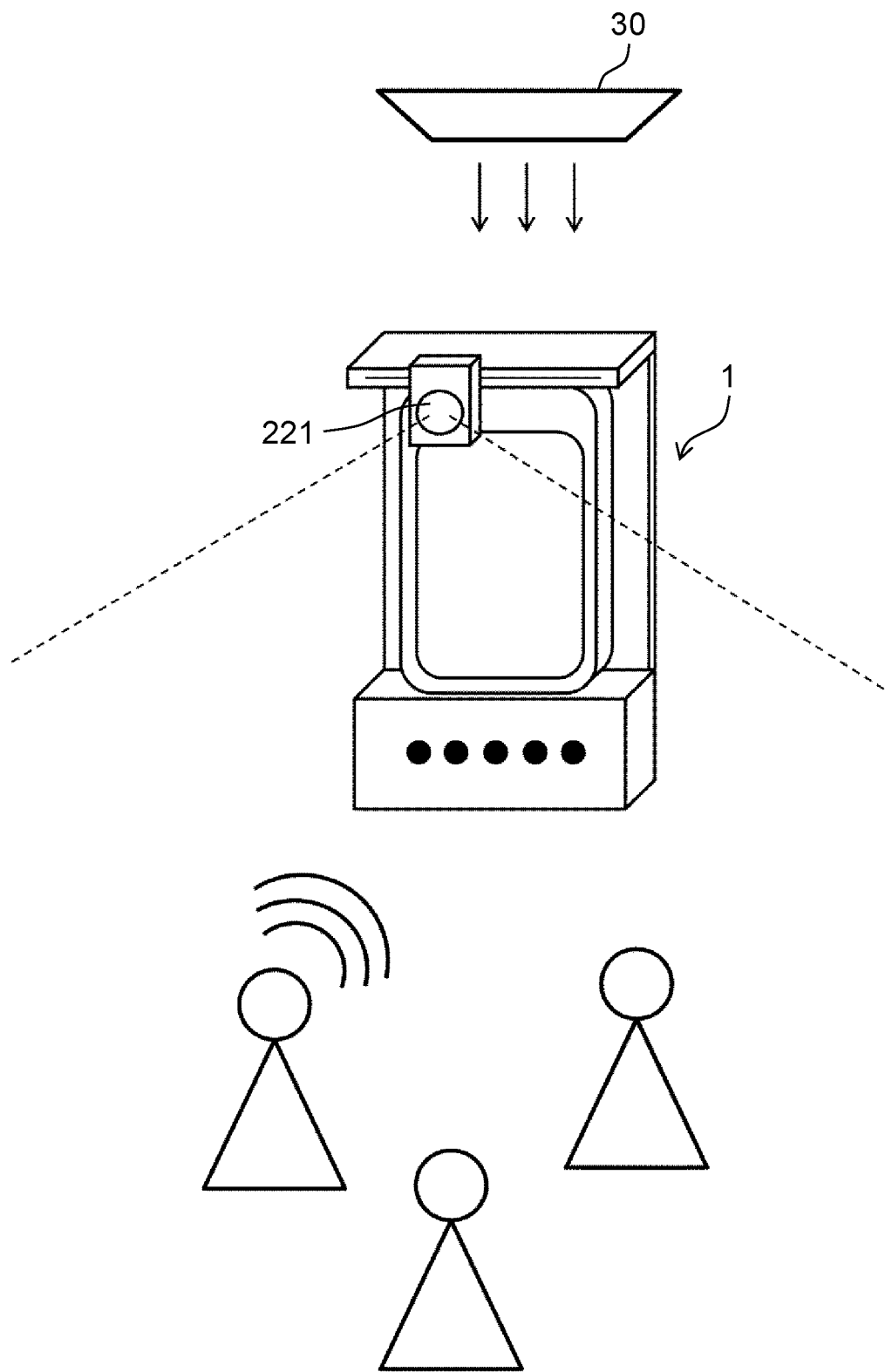
FIG. 11 is a diagram schematically illustrating a state at a time when a sound pickup system is used in vertical placing.
Figure 12:
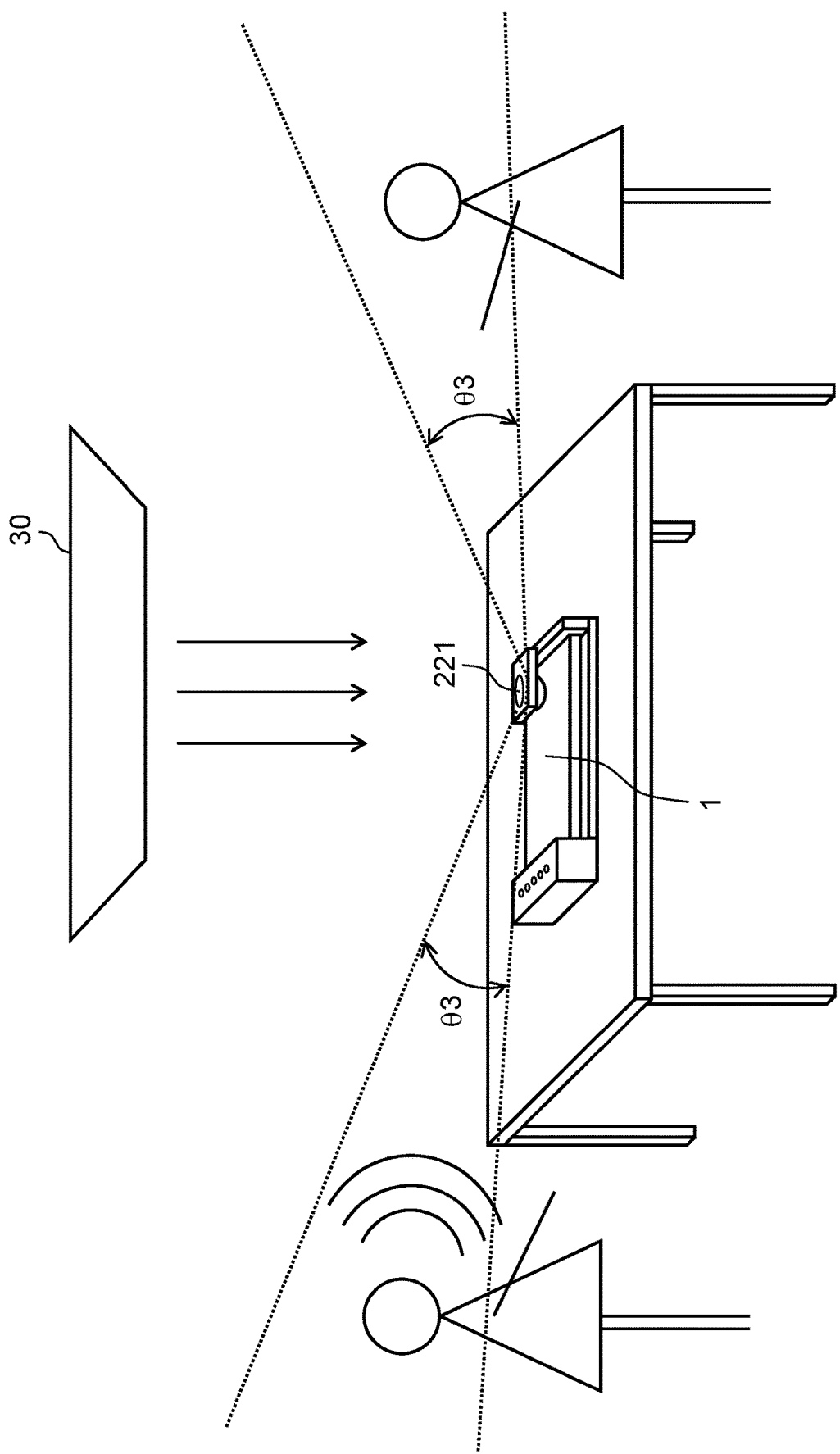
FIG. 12 is a diagram schematically illustrating a state at a time when a sound pickup system is used in flat placing.

Controller 140 generates image data according to the sensed optical-axis direction (S302). Specifically, for example, controller 140 changes image-capturing setting conditions according to the optical-axis direction of camera 110. An example of the image-capturing setting conditions is exposure of camera 110. FIG. 11 schematically illustrates a state at a time when sound pickup system 1 is used in vertical placing. FIG. 12 schematically illustrates a state at a time when sound pickup system 1 is used in flat placing. In vertical placing, as illustrated in FIG. 11, light from illumination appliance 30 on a ceiling does not directly enter camera 110 through optical system 221. On the other hand, in flat placing, as illustrated in FIG. 12, light from illumination appliance 30 on the ceiling directly enters camera 110 through optical system 221. In this case, a center of an image of one frame of a moving image or one still image is bright, and an image in a region that indicates a person around camera 110 is dark. When an image in a region that indicates a person is dark, a location of the person fails to be detected from image data. As a result, the person's speech fails to be precisely extracted. Therefore, in flat placing, sound pickup system 1 determines exposure of camera 110 without using a center portion of image data that is equivalent to one frame of a moving image or one still image. Stated another way, exposure is determined on the basis of brightness or color of an image region in a location of a user. This avoids, for example, a reduction in a time period during which an image sensor such as a CCD image sensor receives light, and an image in a region that indicates the user is prevented from becoming dark. On the other hand, in vertical placing, sound pickup system 1 determines the exposure of camera 110 by using an entirety of an image that is equivalent to one frame of a moving image or one still image of image data. In flat placing, controller 140 may determine whether illumination appliance 30 is included in generated image data on the basis of luminance of the generated image data, and may change the image-capturing setting conditions on the basis of a determination result.

Controller 140 obtains, from sound pickup device 20, an acoustic signal picked up by microphone array 211 (S303).

Controller 140 estimates a location of a sound source from the image data and the acoustic signal (S304). Specifically, controller 140 detects a location of a face from the image data. An arbitrary method is used to detect the location of the face. As an example, the location of the face is detected by dividing image data that is equivalent to one frame of a moving image or one still image into a plurality of regions and determining whether each of the plurality of regions matches features of a face (see "Rapid Object Detection using a Boosted Cascade of Simple Features", ACCEPTED CONFERENCE ON COMPUTER VISION AND PATTERN RECOGNITION, 2001). By doing this, for example, controller 140 calculates probability $Pv(\theta v, \varphi v)$ of a face being indicated in an image located in a location specified by horizontal angle $\theta v$ and vertical angle $\varphi v$ in image data. Horizontal angle $\theta v$ and vertical angle $\varphi v$ in the image data, that is, horizontal angle $\theta v$ and vertical angle $\varphi v$ of an angle of view of camera 110, can be converted into horizontal angle $\theta s$ and vertical angle $\varphi s$ of a coordinate system of microphone array 211 on the basis of the function or the table that has been generated in step S203 and indicates association of coordinates between microphone array 211 and camera 110. Therefore, controller 140 converts probability $Pv(\theta v, \varphi v)$ indicated by a coordinate system of camera 110 into probability $Pv(\theta s, \varphi s)$ indicated by the coordinate system of microphone array 211. Controller 140 also estimates, from the acoustic signal, a location of a sound source, that is, a location where a person who is making a speech is present. An arbitrary method is used to estimate the location of the sound source. For example, the location of the sound source can be estimated by using the cross-power spectrum phase analysis (CSP) method or the multiple signal classification (MUSIC) method. By doing this, for example, controller 140 calculates, from the acoustic signal, probability $Ps(\theta s, \varphi s)$ of the presence of a sound source in a location specified by horizontal angle $\theta s$ and vertical angle $\varphi s$. Then, for example, horizontal angle $\theta s$ and vertical angle $\varphi s$ that cause probability "$Pv(\theta s, \varphi s) \times Ps(\theta s, \varphi s)$" to become highest are estimated as the location of the sound source on the basis of probability $Pv(\theta s, \varphi s)$ of a face being indicated and probability $Ps(\theta s, \varphi s)$ of the presence of a sound source. Note that horizontal angle $\theta s$ and vertical angle $\varphi s$ that cause "$Pv(\theta s, \varphi s) + Ps(\theta s, \varphi s)$" rather than probability "$Pv(\theta s, \varphi s) \times Ps(\theta s, \varphi s)$" to become highest may be estimated as the location of the sound source.

Controller 140 picks up speech serving as target sound that is included in the acoustic signal on the basis of the estimated location of the sound source (S305).

3. Effects and Supplements

Sound pickup system 1 according to the present exemplary embodiment includes sound pickup device 20 and electronic device 10 that can be mounted in sound pickup device 20. Sound pickup device 20 includes microphone array 211 that includes a plurality of microphones. Sound pickup device 20 includes acoustic input unit (sound pickup unit) 210 that generates an acoustic signal that corresponds to ambient sound picked up by microphone array 211, mounting part 230 that can be mounted with electronic device 10, and communication unit 240 that transmits the acoustic signal to electronic device 10. Sound pickup device 20 is peripheral equipment that is mounted with electronic device 10 so as to perform communication with electronic device 10. Electronic device 10 includes camera 110 that images the surroundings and generates image data, and controller 140 that determines a sound pickup direction on the basis of the acoustic signal and the image data. Electronic device 10 is a mobile terminal such as a smartphone or a tablet terminal.

As described above, sound pickup system 1 according to the present exemplary embodiment is not dedicated sound pickup equipment. Sound pickup system 1 has a configuration in which electronic device 10 is attached to sound pickup device 20. Therefore, by employing sound pickup system 1 according to the present exemplary embodiment, target sound can be precisely picked up without dedicated sound pickup equipment. Specifically, by attaching electronic device 10 including camera 110 to sound pickup device 20 including microphone array 211, a sound pickup direction can be determined by using an acoustic signal output from microphone array 211 and image data generated by camera 110. This enables noise-reduced and clear speech to be picked up.

Sound pickup device 20 further includes optical system 221 that further widens an angle of view of camera 110 and is disposed on an optical axis of camera 110. Therefore, electronic device 10 mounted in sound pickup device 20 can image a wider range. For example, even in flat placing, a person around camera 110 can be imaged.

Sound pickup device 20 further includes movable part 261 that causes mounting part 230 to be movable according to a size of electronic device 10. Specifically, movable device 261 causes lower block 230*c* or back plate 230*b* to be movable in a direction in which lower block 230*c* moves away from or toward upper plate 230*a*. By doing this, even when the size of electronic device 10 changes according to a type of electronic device 10, a user can move lower block 230*c* or back plate 230*b* according to the size of electronic device 10 so as to fix electronic device 10 between upper plate 230*a* and lower block 230*c*.

Sound pickup device 20 further includes movable part 262 that causes a location of optical system 221 to be movable according to a location of camera 110. By doing this, even when the location of camera 110 changes according to the type of electronic device 10, a user can move optical system 221 in such a way that optical system 221 of sound pickup device 20 is located on an optical axis of camera 110 of electronic device 10.

Controller 140 of electronic device 10 associates coordinates of microphone array 211 with coordinates of camera 110 on the basis of a relative location of microphone array 211 with respect to optical system 221 and an absolute location of camera 110. By doing this, even when a locational relationship between camera 110 and microphone array 211 changes according to the type of electronic device 10, a location of a sound source can be precisely estimated. This enables target sound to be precisely picked up.

Electronic device 10 further includes sensor 160 that senses an optical-axis direction of camera 110. Controller 140 changes image-capturing setting conditions of camera 110 according to the optical-axis direction of camera 110 that has been sensed by sensor 160. Here, sensor 160 may sense the optical-axis direction of camera 110, for example, by detecting an orientation of electronic device 10. For example, in flat placing, exposure of camera 110 is determined without using a center portion of image data that is equivalent to one frame of a moving image or one still image. By doing this, for example, even when there is illumination appliance 30 on a ceiling, an image in a region that indicates a user can be prevented from becoming dark.

Second Exemplary Embodiment

A second exemplary embodiment is different from the first exemplary embodiment in a method for performing association of coordinates between camera 110 and microphone array 211.

Figure 13:
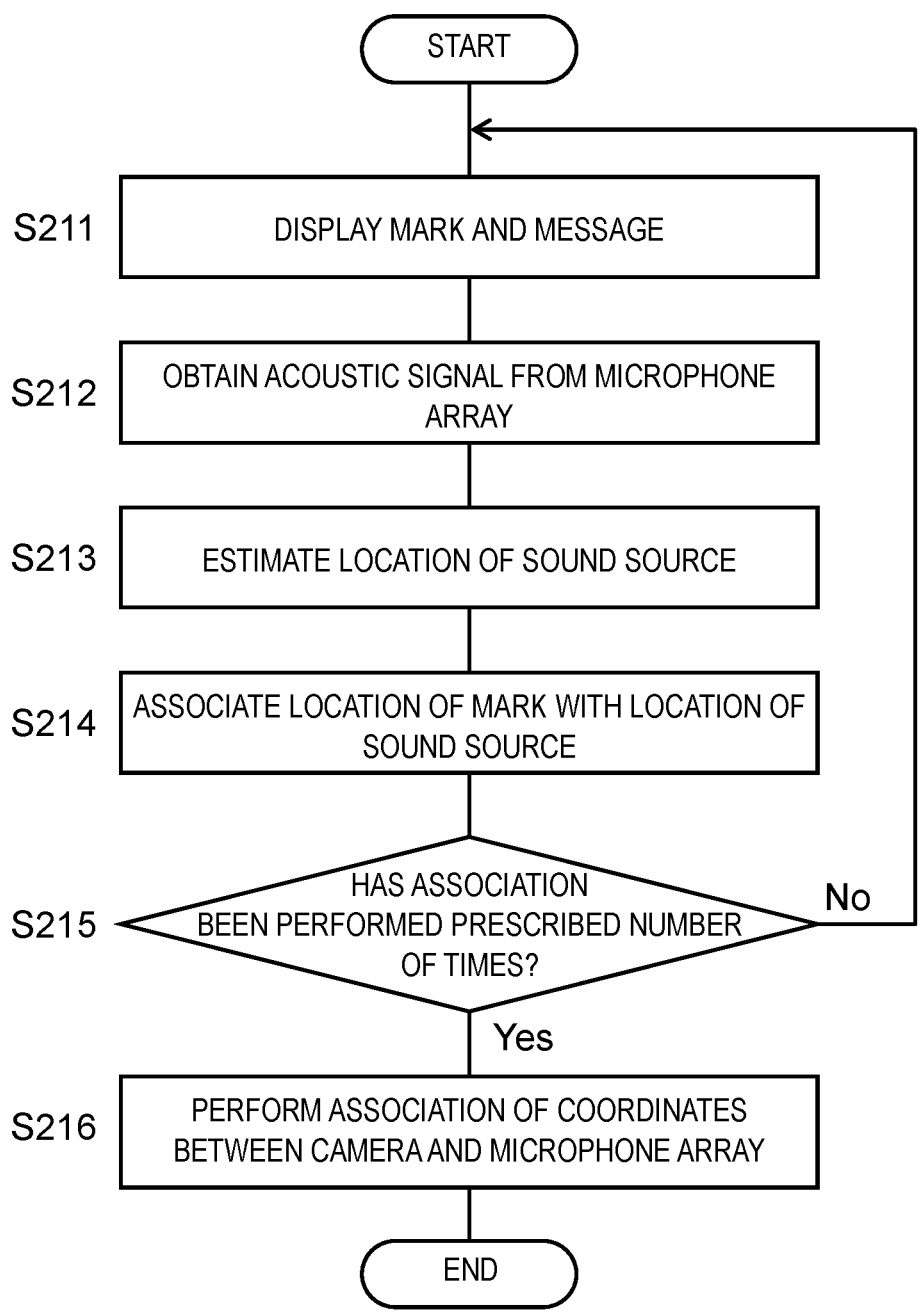
FIG. 13 is a flowchart for explaining association of coordinates between a camera and a microphone array according to a second exemplary embodiment.
Figure 14:
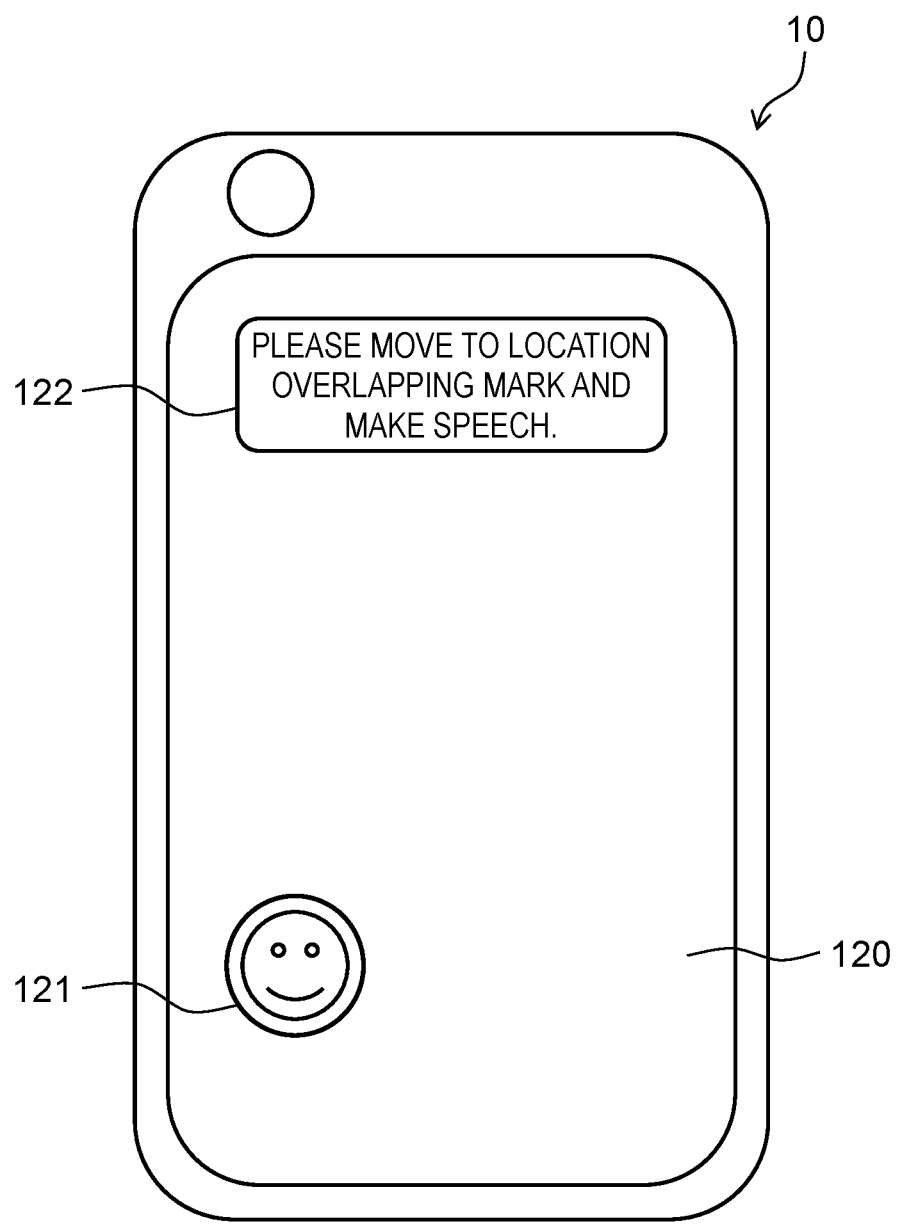
FIG. 14 is a diagram illustrating a display example of a screen at a time when association of coordinates according to the second exemplary embodiment is performed.

FIG. 13 illustrates association of coordinates between camera 110 and microphone array 211 (details of S2) according to the second exemplary embodiment. FIG. 14 illustrates a display example of a screen of display 120 at a time when association of coordinates is performed. While processing illustrated in FIG. 13 is performed, camera 110 is operating, and a live view image that is being captured by camera 110 is displayed on display 120.

Controller 140 of electronic device 10 displays, on display 120, mark 121 that indicates a predetermined location and message 122 that prompts a user to move to a location that overlaps mark 121 and then make a speech (S211). Stated another way, mark 121 is displayed in a predetermined location within the image on display 120. An example of mark 121 that indicates the predetermined location is an image that indicates a person's face. By doing this, a user can move in such a way that the user's face overlaps mark 121, while viewing display 120. Then, the user makes a speech after movement.

Controller 140 obtains, from sound pickup device 20, an acoustic signal picked up by microphone array 211 (S212). Controller 140 estimates a location of a sound source, that is, a location where a person who is making a speech is present, on the basis of the obtained acoustic signal (S213). Controller 140 associates the location of mark 121 with the estimated location of the sound source (S214).

Controller 140 determines whether the location of mark 121 and the location of the sound source have been associated with each other a predetermined number of times (for example, at least three times) (S215). If association has not been performed a predetermined number of times (No in S215), the processing returns to step S211, mark 121 is displayed in a different location within display 120, and association is performed between the location of mark 121 and the location of the sound source. In order to perform association between the location of mark 121 and the location of the sound source in a plurality of locations, controller 140 changes a location where mark 121 is displayed in step S211 every time. The location of mark 121 displayed on display 120 can be associated with horizontal angle θ and vertical angle φ of an angle of view of camera 110. When the location of mark 121 and the estimated location of the sound source have been associated with each other a predetermined number of times (Yes in S215), association of coordinates is performed between camera 110 and microphone array 211 by performing interpolation and extrapolation on association in another location where measurement has not been performed (S216). For example, controller 140 generates a function or a table that enables coordinates of camera 110 to be converted into coordinates of microphone array 211. Controller 140 stores the generated function or table in storage 150.

In a case where precision of association is increased, it is sufficient if a user is caused to move as finely as possible within an image-capturing available range of camera 110. This causes interpolation points in interpolation to become closer to each other, and therefore the precision of association increases. In addition, in order to avoid extrapolation that easily causes a reduction in precision, it is sufficient if a user is caused to move on an outermost side of the image-capturing available range of camera 110.

Before association is performed between the location of mark 121 and the location of the sound source (S214), controller 140 may determine whether a user's face is present within an image region of mark 121 on the basis of the image data. In a case where the face is not present within the image region of mark 121, the processing may return to step S211 without performing association.

In step S211, display 120 may not display mark 121 in a predetermined location within an image. Instead, a speaker of electronic device 10 may output sound indicating the predetermined location within the image. For example, in step S211, the speaker of electronic device 10 may emit the sound "Please move to a lower left corner within an image", and in response to this, a user may move to a location that corresponds to the lower left corner within the image. Then, the user makes a speech after movement. A calibration method according the present disclosure can also be implemented by such an operation.

According to the present exemplary embodiment, similarly to the first exemplary embodiment, association of coordinates is performed between camera 110 and microphone array 211. Therefore, even when a locational relationship between camera 110 and microphone array 211 changes according to a type of electronic device 10, a location of a sound source can be precisely estimated.

Third Exemplary Embodiment

Sound pickup system 1 according to the present exemplary embodiment is different from sound pickup system 1 according to the first exemplary embodiment in a configuration of optical system 221. Specifically, optical system 221 according to the present exemplary embodiment prevents camera 110 from imaging illumination appliance 30 in a case where sound pickup system 1 is used in flat placing.

Figure 15A:
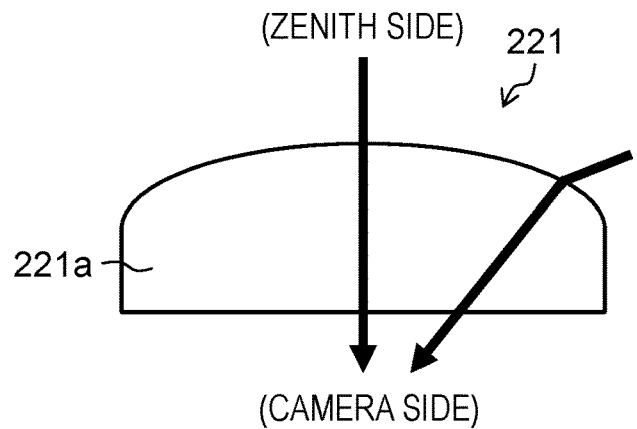
FIG. 15A is a diagram schematically illustrating a wide-angle lens according to a third exemplary embodiment.
Figure 15B:
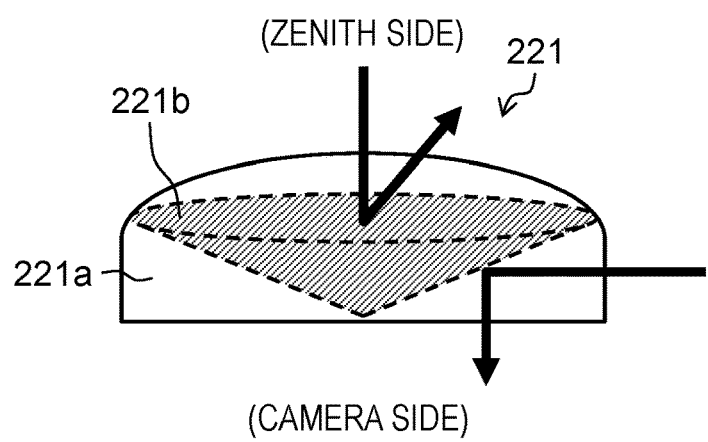
FIG. 15B is a diagram schematically illustrating a conical mirror according to the third exemplary embodiment.
Figure 15C:
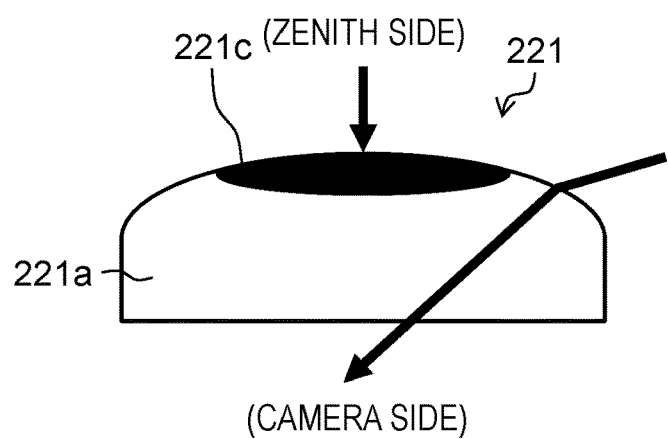
FIG. 15C is a diagram schematically illustrating a shielding cover according to the third exemplary embodiment.

FIG. 15A schematically illustrates a wide-angle lens. FIG. 15B schematically illustrates a conical mirror. FIG. 15C schematically illustrates a shielding cover. In FIGS. 15A to 15C, upper sides in the drawings are zenith sides, and lower sides in the drawings are sides of camera 110. Stated another way, FIGS. 15A to 15C illustrate optical system 221 in a state where sound pickup system 1 is flatly placed.

Optical system 221 illustrated in FIG. 15A is configured, for example, by wide-angle lens 221a having a roughly omnidirectional angle of view. Wide-angle lens 221a may not have a roughly omnidirectional angle of view if wide-angle lens 221a can widen an angle of view of camera 110 of electronic device 10 mounted in mounting part 230. In addition, wide-angle lens 221a widening the angle of view means that electronic device 10 mounted in the mounting part is enabled to image a region outside the angle of view of camera 110.

Optical system 221 illustrated in FIG. 15B is configured by wide-angle lens 221a that incorporates conical mirror 221b having a conical shape. In this case, light from the zenith side, that is, light from illumination appliance 30 equipped on a ceiling, is reflected by conical mirror 221b. Therefore, the light from illumination appliance 30 does not reach camera 110. Wide-angle lens 221a may be omitted from optical system 221 illustrated in FIG. 15B. Optical system 221 illustrated in FIG. 15B includes conical mirror 221b, and therefore light from the zenith side is suppressed from entering camera 110, and light from a horizontal direction (a direction perpendicular to an optical axis of the camera) can enter camera 110. By doing this, optical system 221 illustrated in FIG. 15B can widen the angle of view of camera 110. Optical system 221 widening the angle of view means that electronic device 10 mounted in the mounting part is enabled to image a region outside the angle of view of camera 110. In addition, conical mirror 221b may have a polygonal pyramid shape such as a quadrangular pyramid shape. In a case where four persons that are present on respective sides of a rectangular table are imaged, if conical mirror 221b has a quadrangular pyramid shape, a video without distortion can be captured.

Optical system 221 illustrated in FIG. 15C includes wide-angle lens 221a and shielding cover 221c. Shielding cover 221c is attached on a surface of wide-angle lens 221a. In this case, light from the zenith side, that is, light from illumination appliance 30 equipped on a ceiling, is absorbed by shielding cover 221c. Therefore, the light from illumination appliance 30 does not reach camera 110. When optical system 221 including conical mirror 221b or shielding cover 221c is disposed on the optical axis of camera 110, an image-capturing region of camera 110 is a region excluding a region around the optical axis of camera 110.

Sound pickup system 1 according to the present exemplary embodiment includes, for example, two optical systems, optical system 221 illustrated in FIG. 15A and optical system 221 illustrated in FIG. 15B or 15C. A user can select optical system 221 to be disposed on the optical axis of camera 110 from among the two optical systems 221 in accordance with whether sound pickup system 1 is used in vertical placing or in flat placing. In flat placing, by using optical system 221 including conical mirror 221b or shielding cover 221c, only a direction in which a person is present, as illustrated as angle θ3 (for example, within a range of 45° from a horizontal plane) in FIG. 12, can be imaged without imaging the surroundings of illumination appliance 30. In this case, in step S302 of FIG. 10, controller 140 generates image data under the same image-capturing setting conditions regardless of whether sound pickup system 1 is flatly placed or vertically placed. For example, exposure of camera 110 in flat placing is determined on the basis of brightness and color of an entirety of an image similarly to vertical placing.

A member that shields light from illumination appliance 30 is not limited to conical mirror 221b and shielding cover 221c. An arbitrary configuration can be employed that can prevent camera 110 from imaging illumination appliance 30 in flat placing. In addition, shielding cover 221c may be configured to be detachable.

According to the present exemplary embodiment, even when sound pickup system 1 is flatly placed, camera 110 can be prevented from imaging illumination appliance 30. Therefore, similarly to the first exemplary embodiment, a face of a person that is present around sound pickup system 1 can be precisely detected. Thus, target sound can be precisely picked up.

Other Exemplary Embodiments

The first to third exemplary embodiments have been described above to exemplify the technique disclosed in the present application. However, a technique according to the present disclosure is not limited to these exemplary embodiments, and is applicable to exemplary embodiments in which changes, replacements, additions, omissions, or the like have been made as appropriate. In addition, a new exemplary embodiment can be formed by combining respective components described in the first to third exemplary embodiments described above. Accordingly, other exemplary embodiments are described below as examples.

In the exemplary embodiments described above, controller 140 of electronic device 10 determines a sound pickup direction on the basis of an acoustic signal that has been output from microphone array 211 and image data that has been output from camera 110, and picks up target sound. However, controller 250 of sound pickup device 20 may determine the sound pickup direction on the basis of the acoustic signal that has been output from microphone array 211 and the image data that has been output from camera 110, and picks up the target sound.

Starting and ending of sound pickup may be determined on the basis of a shape of lips that are included in image data output from camera 110 (for example, whether the lips are open). For example, electronic device 10 stores information indicating a feature amount of a state where lips are open, and determines whether lips are open in the image data on the basis of the information. By doing this, electronic device 10 detects a start point in time and an end point in time of utterance. A period from the start point in time of utterance to the end point in time of utterance is an utterance section. Alternatively, electronic device 10 may use an acoustic signal as an input, and may detect the utterance section on the basis of acoustic features. Alternatively, electronic device 10 may detect the utterance section on the basis of feature amounts of both the image data and the acoustic signal.

In the exemplary embodiments described above, movable part 261 is a member that causes lower block 230c or back plate 230b to be movable in a longitudinal direction (the Z-axis direction in FIG. 3B) of sound pickup device 20. However, a movable direction is not limited to the longitudinal direction. For example, movable part 261 may have a configuration that causes lower block 230c or back plate 230b to be movable in a thickness direction (a Y-axis direction in FIGS. 3A and 3B) of sound pickup device 20. Similarly, movable part 262 may have a configuration that causes optical system 221 to be movable in a thickness direction (a Y-axis direction in FIGS. 4A and 4B) of sound pickup device 20.

In the exemplary embodiments described above, an example has been described where electronic device 10 and sound pickup device 20 include a USB terminal. However, in a case where wireless communication is performed, a terminal may be omitted from sound pickup device 20. Stated another way, communication unit 130 of electronic device 10 may perform wireless communication with communication unit 240 of sound pickup device 20.

In the exemplary embodiments described above, sound pickup device 20 includes optical system 221 having an angle of view that is wider than an angle of view of camera 110. However, in a case where camera 110 includes a wide-angle lens, optical system 221 may be omitted from sound pickup device 20.

SUMMARY OF EXEMPLARY EMBODIMENTS (1) Sound pickup device 20 according to the present disclosure includes acoustic input unit 210 (a sound pickup unit), mounting part 230, and communication unit 240. Acoustic input unit 210 includes microphone array 211 including a plurality of microphones. Acoustic input unit 210 generates an acoustic signal that corresponds to ambient sound that has been picked up by the microphone array. Mounting part 230 can be mounted with electronic device 10 including camera 110 that images the surroundings and generates image data. Communication unit 240 transmits the acoustic signal to the electronic device.

This enables target sound to be precisely picked up without dedicated sound pickup equipment. Specifically, by attaching electronic device 10 including camera 110 to sound pickup device 20 including microphone array 211, the acoustic signal output from microphone array 211 and the image data generated by camera 110 can be used. This enables noise-reduced and clear speech to be picked up.

(2) Sound pickup device 20 of (1) may further include optical system 221 that can image a region outside an angle of view of camera 110 of electronic device 10 mounted in mounting part 230.

By doing this, electronic device 10 mounted in sound pickup device 20 can image a wider range. For example, even in flat placing, a person around camera 110 can be imaged.

(3) Sound pickup device 20 of (2) may further include first movable part 262 that causes a location of optical system 221 to be movable.

By doing this, even when the location of camera 110 changes according to each type of electronic device 10, a user can move optical system 221 in such a way that optical system 221 of sound pickup device 20 is located on an optical axis of camera 110 of electronic device 10. Stated another way, the user can move optical system 221 according to the location of camera 110.

(4) In sound pickup device 20 of (2), optical system 221 may include wide-angle lens 221a that widens the angle of view of camera 110, and a prevention member (shielding cover 221c) that reflects or absorbs light traveling along the optical axis of camera 110. Here, shielding cover 221c absorbs, for example, 90% or more of the light traveling along the optical axis of camera 110.

In addition, in sound pickup device 20 of (2), optical system 221 may include conical mirror 221b that enables the region outside the angle of view of camera 110 of electronic device 10 mounted in mounting part 230 to be imaged. Here, conical mirror 221b reflects, for example, 90% or more of the light traveling along the optical axis of camera 110.

By doing this, for example, even when there is illumination appliance 30 on a ceiling, illumination appliance 30 can be prevented from being imaged, and therefore an image in a peripheral region that indicates a user can be prevented from becoming dark. Thus, a person's face can be precisely detected from the image data.

(5) In sound pickup device 20 of any of (1) to (4), mounting part 230 may include lower block 230c or back plate 230b (an example of a fixing member) that is movable to fix electronic device 10.

By doing this, even when a size of electronic device 10 changes, a user can fix electronic device 10 to mounting part 230.

(6) Sound pickup system 1 according to the present disclosure includes sound pickup device 20 described in any of (1) to (5) and electronic device 10 that can be mounted in sound pickup device 20.

This enables target sound to be precisely picked up without dedicated sound pickup equipment.

(7) In sound pickup system 1 of (6), electronic device 10 may further include controller 140 that determines a sound pickup direction on the basis of the acoustic signal and the image data.

This enables target sound to be precisely picked up.

(8) In sound pickup system 1 of (7), controller 140 may associate location coordinates of the ambient sound picked up by microphone array 211 with location coordinates of the surroundings imaged by camera 110 on the basis of a relative location from camera 110 to microphone array 211.

By doing this, even when a locational relationship between camera 110 and microphone array 211 changes according to the type of electronic device 10, a location of a sound source can be precisely estimated.

(9) In sound pickup system 1 of (7), sound pickup device 20 may include optical system 221 that has an angle of view that is wider than the angle of view of camera 110 and is disposed on the optical axis of camera 110. Controller 140 may associate coordinates of microphone array 211 with coordinates of camera 110 on the basis of a relative location from optical system 221 to microphone array 211 and an absolute location of camera 110.

By doing this, even when a locational relationship between camera 110 and microphone array 211 changes according to the type of electronic device 10, a location of a sound source can be precisely estimated.

(10) In sound pickup system 1 of (7), electronic device 10 may further include sensor 160 that senses an optical-axis direction of camera 110. Controller 140 may change image-capturing setting conditions of camera 110 in accordance with the optical-axis direction of camera 110 that has been sensed by sensor 160.

By doing this, for example, even when there is illumination appliance 30 on a ceiling, an image in a region that indicates a user can be prevented from becoming dark.

(11) A sound pickup method according to the present disclosure is a method for mounting an electronic device in a sound pickup device and picking up target sound. The sound pickup method includes associating location coordinates of the surroundings picked up by a microphone array with location coordinates of ambient sound imaged by a camera on the basis of a relative location from the camera to the microphone array, and determining a direction in which the target sound will be picked up on the basis of an acoustic signal and image data. Here, the electronic device including the camera that images the surroundings and generates the image data. In addition, the sound pickup device includes the microphone array that includes a plurality of microphones. The sound pickup device includes a sound pickup unit that generates an acoustic signal that corresponds to the ambient sound picked up by the microphone array, a mounting part that can be mounted with the electronic device, and a communication unit that transmits the acoustic signal to the electronic device.

This enables target sound to be precisely picked up without dedicated sound pickup equipment. Specifically, by attaching electronic device 10 including camera 110 to sound pickup device 20 including microphone array 211, the acoustic signal output from microphone array 211 and the image data generated by camera 110 can be used. This enables noise-reduced and clear speech to be picked up.

(12) A program according to the present disclosure causes a computer to perform the sound pickup method of (11).

A sound pickup system, a sound pickup device, a sound pickup method, and a calibration method according to all of the claims of the present disclosure are implemented by, for example, cooperation between hardware resources, such as a processor or a memory, and a program.

INDUSTRIAL APPLICABILITY

A sound pickup device according to the present disclosure is useful, for example, as sound pickup equipment that is mounted with an electronic device so as to pick up speech of a person who is making conversation.

REFERENCE MARKS IN THE DRAWINGS 1 sound pickup system
10 electronic device
20 sound pickup device
110 camera
120 display
130, 240 communication unit
140, 250 controller
150 storage
160 sensor
170 bus
210 acoustic input unit
211 microphone array
212, 282 amplifier
213 A/D converter
220 wide-angle assistance part
221 optical system
221a wide-angle lens
221b conical mirror
221c shielding cover
230 mounting part
230b back plate (fixing member)
230c lower block (fixing member)
261, 262 movable part
270 movement detector
280 acoustic output unit
281 speaker
283 D/A converter

The invention claimed is:
1. A sound pickup system comprising:
an electronic device including:
    a camera that generates image data by imaging surroundings; and
    a controller; and
a sound pickup device including:
    a sound pickup unit that includes a microphone array including a plurality of microphones, the sound pickup unit generating an acoustic signal that corresponds to ambient sound that has been picked up by the microphone array;
    a mounting part on which the electronic device is mounted;
    a communication unit that transmits the acoustic signal to the electronic device;

an optical system that images a region outside an angle of view of the camera of the electronic device;

a first movable part that causes a location of the optical system to be movable; and a movement detector that detects an amount of movement of the first movable part, wherein:

the controller:
- detects a relative location from the camera to the microphone array, based on the amount of movement of the first movable part,
- associates location coordinates of the ambient sound picked up by the microphone array with location coordinates of the surroundings imaged by the camera, based on the relative location from the camera to the microphone array, and
- determines a sound pickup direction based on the acoustic signal, the image data, and the associated location coordinates.

2. The sound pickup system according to claim 1, wherein the optical system includes:
- a lens that widens the angle of view of the camera; and
- a prevention member that reflects or absorbs light traveling along an optical axis of the camera.

3. The sound pickup system according to claim 1, wherein the optical system includes a conical mirror that causes the region outside the angle of view of the camera of the electronic device to be imaged.

4. The sound pickup system according to claim 1, wherein the mounting part includes a fixing member that is movable to fix the electronic device.

5. The sound pickup system according to claim 4, wherein the microphone array is attached to the fixing member.

6. The sound pickup system according to claim 5, wherein the movement detector further detects an amount of movement of the fixing member, and the controller detects the relative location from the camera to the microphone array, based on both of the amount of movement of the first movable part and the amount of movement of the fixing member.

7. The sound pickup system according to claim 4, wherein the communication unit is attached to the fixing member.

8. The sound pickup system according to claim 1, wherein the electronic device further includes a sensor that senses an optical-axis direction of the camera, and the controller changes image-capturing setting conditions of the camera in accordance with the optical-axis direction of the camera that has been sensed by the sensor.

9. A sound pickup method for mounting an electronic device on a sound pickup device and picking up target sound, the electronic device including a camera that generates image data by imaging surroundings, and the sound pickup device including:
- a sound pickup unit that includes a microphone array including a plurality of microphones, the sound pickup unit generating an acoustic signal that corresponds to ambient sound that has been picked up by the microphone array;
- a mounting part on which the electronic device is mounted;
- a communication unit that transmits the acoustic signal to the electronic device;
- an optical system that images a region outside an angle of view of the camera of the electronic device; and
- a first movable part that causes a location of the optical system to be movable; and the sound pickup method comprising:
- detecting an amount of movement of the first movable part;
- detecting a relative location from the camera to the microphone array, based on the amount of movement of the first movable part;
- associating location coordinates of the ambient sound picked up by the microphone array with location coordinates of the surroundings imaged by the camera based on the relative location from the camera to the microphone array; and
- determining a direction that the target sound will be picked up in based on the acoustic signal, the image data and the associated location coordinates.

10. A non-transitory recording medium storing a program that causes a computer to perform the sound pickup method according to claim 9.

11. A calibration method that uses the sound pickup system according to claim 1, the sound pickup system further including a display, the calibration method comprising:
- displaying an image on the display;
- outputting a location in the image;
- picking up sound by using the microphone array;
- estimating a location of the sound; and
- associating coordinates of the location in the image with coordinates of the location of the sound.

12. The calibration method according to claim 11, wherein
in the outputting the location in the image, a mark is displayed in the location in the image on the display.

* * * * *